US009645810B2

(12) United States Patent
Kubo

(10) Patent No.: US 9,645,810 B2
(45) Date of Patent: May 9, 2017

(54) PROCESSING APPARATUS CAPABLE TO DETERMINE A STORAGE MEDIUM THAT CONTAINS CORRECT DATA FOR MANAGEMENT BOARD BY COMPARING CASING SERIAL NUMBERS EACH STORED IN CASING MEMORY, PORTABLE MEMORY, AND FLASH MEMORY

(71) Applicant: FUJITSU LIMITED, Kawasaki-shi, Kanagawa (JP)

(72) Inventor: Hayato Kubo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 515 days.

(21) Appl. No.: 14/105,824

(22) Filed: Dec. 13, 2013

(65) Prior Publication Data

US 2014/0101423 A1 Apr. 10, 2014

Related U.S. Application Data

(63) Continuation of application No. PCT/JP2011/064443, filed on Jun. 23, 2011.

(51) Int. Cl.
*G06F 9/00* (2006.01)
*G06F 9/24* (2006.01)
(Continued)

(52) U.S. Cl.
CPC ............... *G06F 8/65* (2013.01); *G06F 8/665* (2013.01); *G06F 8/71* (2013.01); *G06F 11/006* (2013.01);
(Continued)

(58) Field of Classification Search
CPC ........ G06F 8/65; G06F 8/665; G06F 11/1433; H04L 41/082; H04L 63/0876
See application file for complete search history.

(56) References Cited

U.S. PATENT DOCUMENTS 5,864,664 A * 1/1999 Capps, Jr. ............. G06F 11/006
714/E11.019
6,754,895 B1 * 6/2004 Bartel ....................... G06F 8/65
717/171
(Continued)

FOREIGN PATENT DOCUMENTS

JP H06-348483 12/1994
JP 2003-0765464 A 3/2003
(Continued)

OTHER PUBLICATIONS

O. Hamada "High-Reliability Technology of Mission-Critical IA Server:PRIMEQUEST" Fujitsu, May 10, 2005, vol. 56, No. 3, pp. 194-200 (English Translation of the Abstract).
(Continued)

*Primary Examiner* — Thomas Lee
*Assistant Examiner* — Zhipeng Wang
(74) *Attorney, Agent, or Firm* — Fujitsu Patent Center

(57) ABSTRACT

A processing device includes: casing; a processor in the casing; and a management board detachably mounted on the casing and manages the processor. The casing includes a memory storing therein first identification data to identify the casing. The management board includes a non-volatile memory storing therein second identification data of the casing mounting thereon the management board and second setting data to be referred by firmware, a portable recording medium being detachably mounted on the management board and storing therein third identification data of the casing mounting thereon the management board that mounts thereon the portable recording medium and third setting data to be referred by firmware, and a determiner. The determiner determines, using the first, second, and third identification data, whether the non-volatile memory or the portable recording medium stores setting data to be referred by the firmware operating on the management board.

20 Claims, 6 Drawing Sheets

(51) Int. Cl.
  *G06F 15/177*   (2006.01)
  *G06F 9/445*    (2006.01)
  *G06F 11/00*    (2006.01)
  *G06F 9/44*     (2006.01)
  *H04L 12/24*    (2006.01)
  *H04L 29/06*    (2006.01)
  *G06F 11/14*    (2006.01)
  *G06F 11/32*    (2006.01)

(52) U.S. Cl.
  CPC ........ *G06F 11/1433* (2013.01); *G06F 11/325* (2013.01); *H04L 41/082* (2013.01); *H04L 63/0876* (2013.01)

(56) References Cited

U.S. PATENT DOCUMENTS

| | | | | |
|---|---|---|---|---|
| 7,225,251 B2* | 5/2007 | Suzuki | ............... | G03G 15/5079 709/203 |
| 2005/0208967 A1* | 9/2005 | Buniatyan | ........... | G06F 11/1456 455/557 |
| 2006/0195466 A1* | 8/2006 | Yoshimura | ............... | H04L 41/28 |
| 2006/0225069 A1* | 10/2006 | Yuuki | ....................... | G06F 8/65 717/170 |
| 2007/0208916 A1* | 9/2007 | Tomita | .................... | G06F 21/10 711/162 |
| 2008/0282046 A1* | 11/2008 | Yuuki | ................. | G06F 11/1417 711/159 |
| 2009/0222804 A1* | 9/2009 | Kaufman | ............. | B23K 9/0953 717/168 |

FOREIGN PATENT DOCUMENTS

| | | |
|---|---|---|
| JP | 2005-78529 A | 3/2005 |
| JP | 2006-243789 A | 9/2006 |
| JP | 2006-260330 A | 9/2006 |

OTHER PUBLICATIONS

International Search Report, mailed in connection with PCT/JP2011/064443 and mailed Sep. 20, 2011.

* cited by examiner

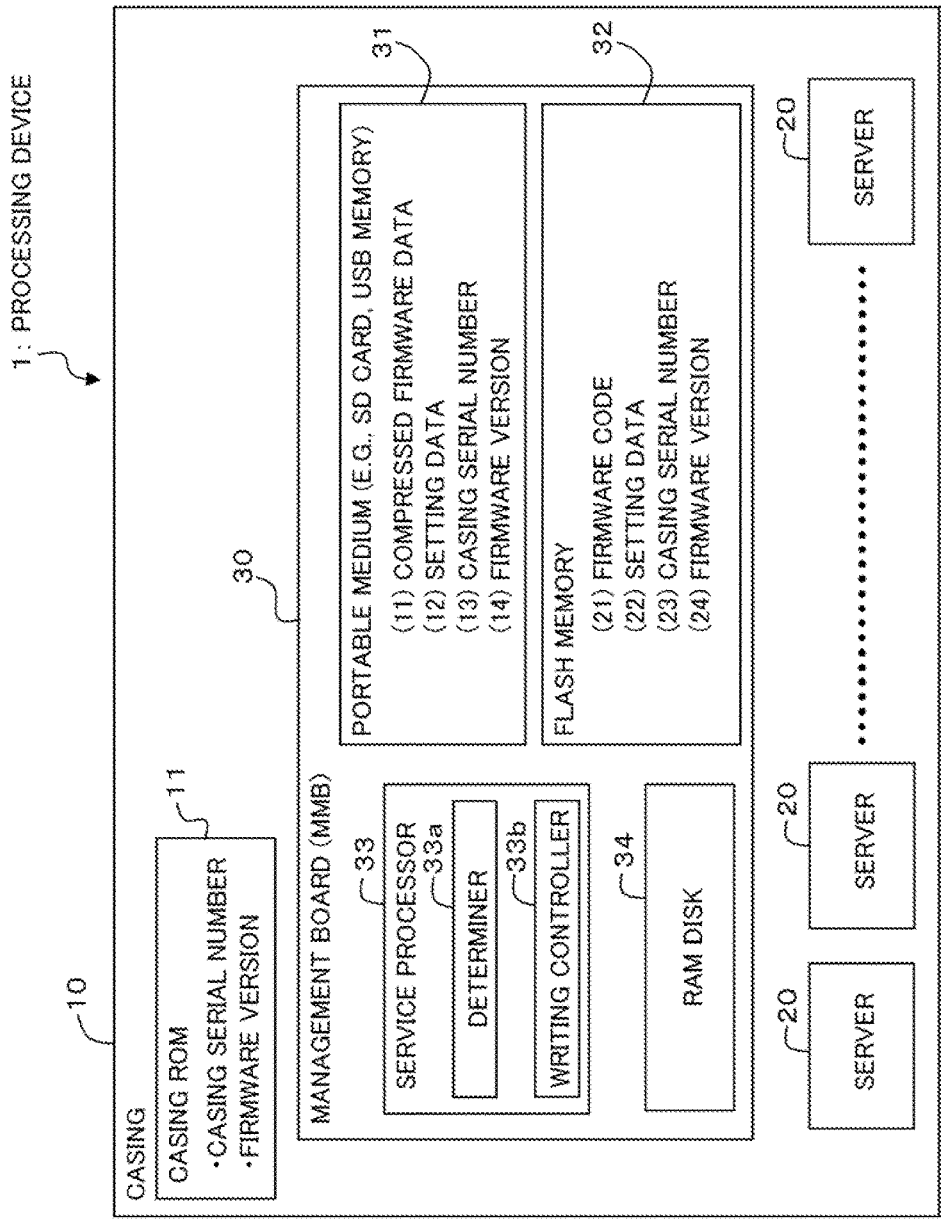

FIG. 2

| PATTERN | | MANAGEMENT BOARD 30 | | CASING | RESULT | PLACE WHERE SETTING DATA TO BE REFERRED IS STORED |
| --- | --- | --- | --- | --- | --- | --- |
| | | PORTABLE MEDIUM 31 | FLASH MEMORY 32 | ROM 11 | | |
| 1 | CASING SERIAL NUMBER | S/N(A) | NULL | S/N(A) | OK | PORTABLE MEDIA |
| | FIRMWARE VERSION | Ver.1 | Ver.x | Ver.1 | | |
| 2 | CASING SERIAL NUMBER | NULL | S/N(A) | S/N(A) | OK | FLASH MEMORY |
| | FIRMWARE VERSION | Ver.x | Ver.1 | Ver.1 | | |
| 3 | CASING SERIAL NUMBER | S/N(A) | S/N(A) | S/N(C) | OK | FLASH MEMORY |
| | FIRMWARE VERSION | Ver.1 | Ver.1 | NULL | | |
| 4 | CASING SERIAL NUMBER | NULL | NULL | S/N(A) | OK | FLASH MEMORY |
| | FIRMWARE VERSION | Ver.1 | Ver.1 | Ver.1 | | |
| 5 | CASING SERIAL NUMBER | S/N(A) | S/N(A) | S/N(A) | OK | FLASH MEMORY |
| | FIRMWARE VERSION | Ver.1 | Ver.1 | Ver.1 | | |
| 6 | CASING SERIAL NUMBER | S/N(A) | S/N(B) | S/N(A) | OK | PORTABLE MEDIA |
| | FIRMWARE VERSION | Ver.1 | Ver.2 | Ver.1 | | |
| 7 | CASING SERIAL NUMBER | S/N(B) | S/N(A) | S/N(A) | NG | NONE |
| | FIRMWARE VERSION | Ver.2 | Ver.1 | Ver.1 | | |
| 8 | CASING SERIAL NUMBER | S/N(B) | NULL | S/N(A) | NG | NONE |
| | FIRMWARE VERSION | Ver.2 | Ver.x | Ver.1 | | |
| 9 | CASING SERIAL NUMBER | NULL | S/N(B) | S/N(A) | NG | NONE |
| | FIRMWARE VERSION | Ver.x | Ver.2 | Ver.1 | | |
| 10 | CASING SERIAL NUMBER | S/N(B) | S/N(B) | S/N(A) | NG | NONE |
| | FIRMWARE VERSION | Ver.2 | Ver.2 | Ver.1 | | |

PROCESSING APPARATUS CAPABLE TO DETERMINE A STORAGE MEDIUM THAT CONTAINS CORRECT DATA FOR MANAGEMENT BOARD BY COMPARING CASING SERIAL NUMBERS EACH STORED IN CASING MEMORY, PORTABLE MEMORY, AND FLASH MEMORY

CROSS-REFERENCE TO RELATED APPLICATION

This application is a continuation application of International Application No. PCT/JP2011/064443, filed on Jun. 23, 2011, and designated the U.S., the entire contents of which are incorporated herein by reference.

FIELD

The embodiment discussed herein is a processing device and a management board.

BACKGROUND

A blade system or a system including partitioning function includes multiple server regions being included in a single casing but being independent of one another. The casing also includes a manager that manages the multiple servers and shared components. The manager is typically configured to be a board, called management board (MMB), detachably mounted on the casing. On the MMB, a service processor and a flash memory that enable the firmware to operate are mounted to exert functions of monitoring voltage, temperature, and fan rotating speed of the casing and controlling the power source, the electric power, and the fan on the basis of the results of the monitoring.

If a hardware failure occurs in the MMB, the failed MMB needs to be replaced with another MMB. In the replacement, the version (e.g., Ver. A1) of the firmware mounted on a new board to be replaced for the failed board may be different from the version (e.g., Ver. A2) of the firmware operating on the failed board. In this case, the system manager or a person in charge of maintenance (operator) replaces the failed board with the new board and then updates the firmware of the new board to the firmware that has been operated on the failed board. In other words, the version of the firmware mounted on the new board is updated from Ver. A1 to Ver. A2. This updating intends the system is kept operating using the firmware of the version that has enabled the system to stable operate and thereby reduces the risk of occurrence of an unexpected system error even after the replacement of the board.

Conventionally, the system manager or the person in charge of maintenance has determined, after the replacement, whether the firmware on a non-volatile memory mounted on the new board needs to be updated. If determining that updating is needed, the system manager or the person in charge of maintenance brings an external memory, which stores therein the updating firmware, executes the program from the external memory, and updates the firmware.

Furthermore, conventional replacement of the board has been carried out in the following manner. First of all, instruction means and storing means are prepared exterior of the board and, before the replacement of a board, setting data containing various settings of the firmware that has been operated on the previous board is temporarily evacuated to the external storing means. Specifically, the operator temporarily evacuates the contents in the non-volatile memory through operation in obedience to the instruction means. Then, after the replacement of the board is completed, the operator restores the contents of the previous board which contents have been evacuated to the external storing means to a non-volatile memory of the new board through operation in obedience to the instruction means. In this method, the operator makes the backup of the setting data when the setting data of the firmware is to be modified, and after the new board is replaced for the previous board restores the backed-up setting data to be the setting data of the firmware of the new board.

However, the above manner needs determination as to whether the firmware need to undergo updating, the determination being made by operator and partially being made by manual operation. For the above, it takes long time to replace the board and the replacement has a possibility of unexpectedly stopping the system operation due to operation mistake. In addition, there is possibility that the operator does not grasp the version of the firmware having been operated on the previous board and therefore does not determine whether the firmware needs updating, so that the firmware of the same version as that on the previous board is not restored on the new board.

When the setting data of various setting of the firmware is taken over from the previous board to the new board, the above method forces the operator to accomplish the operation using external instructing means and storing means, which needs considerable labor. Some failure occurring in the board may make it impossible to evacuate the contents in the non-volatile memory before the replacement, which may result in that the contents on the non-volatile memory disposed in the previous board are not restored in the non-volatile memory in the new board. Furthermore, each time the setting data is modified, the operator has to make the backup of the modified setting data, which takes considerable workload. If the operator forgets to make the backup of the setting data, the setting data is not restored, which forces the operator to manually set the setting data again.

The above conventional methods have the following problems.

After the MMB (management board) is replaced with another MMB, the operator has to confirm whether updating of the firmware is need, but the need for updating is sometimes indeterminable.

The operator manually updates the firmware, which takes time and has a possibility of system halt due to operation mistake.

In some cases, the setting data of the firmware is not restorable.

SUMMARY

There is provided a processing device including: casing; a processor disposed in the casing; and a management board that is detachably mounted on the casing and that manages the processor. The casing includes a memory that stores therein first identification data to identify the casing. The management board includes a non-volatile memory, a portable recording medium, and a determiner. The non-volatile memory stores therein second identification data of the casing mounting thereon the management board and second setting data that is to be referred by firmware. The portable recording medium is detachably mounted on the management board and stores therein third identification data of the casing mounting thereon the management board that mounts thereon the portable recording medium and third setting data that is to be referred by firmware. The determiner determines, using the first identification data stored in the memory, the second identification data stored in the non-volatile memory, and the third identification data stored in the portable recording medium being mounted on the management board, whether the non-volatile memory or the portable recording medium stores setting data to be referred by the firmware that is to operate on the management board.

There is provided a management board that is detachably mounted on a casing and that manages a processor disposed in the casing, the management board including: a non-volatile memory; a portable medium, and a determiner. The non-volatile memory stores therein first identification data to identify the casing mounting thereon the management board and first setting data that is to be referred by firmware. The portable recording medium that is detachably mounted on the management board and that stores therein second identification data of the casing mounting thereon the management board that mounts thereon the portable recording medium and second setting data that is to be referred by firmware. The determiner that determines, using the first identification data stored in the non-volatile memory, the second identification data stored in the portable recording medium being mounted on the management board, and third identification data stored in a memory disposed in the casing, whether the non-volatile memory or the portable recording medium stores setting data to be referred by the firmware is to operate on the first management board.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING

FIG. 1 is a block diagram schematically illustrating the hardware and functional configurations of a processing device and a management board according to a first embodiment;

FIG. 2 is a diagram illustrating an example of a table for determining a device storing setting data of the first embodiment;

DESCRIPTION OF EMBODIMENTS

Figure 3:
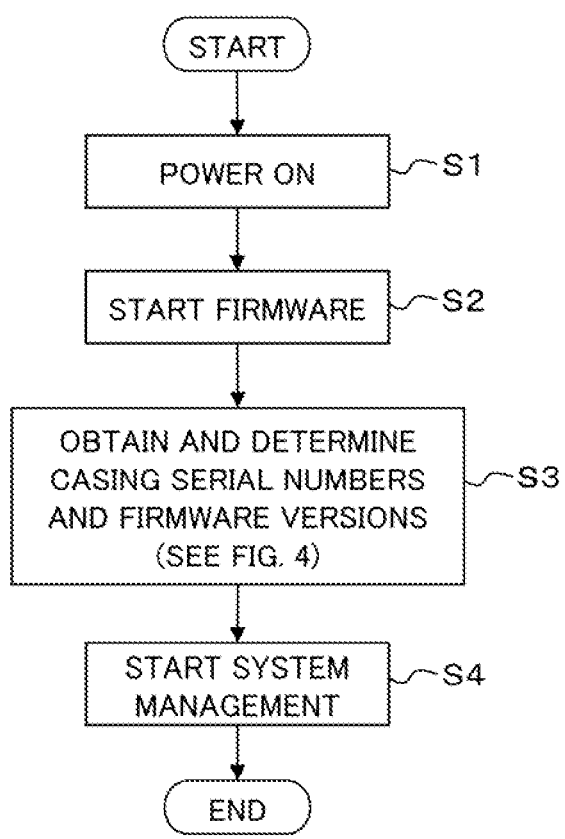
FIG. 3 is a flow diagram illustrating a succession of procedural steps of operation performed when a processing device (management board) of the first embodiment is started.

Hereinafter, a first embodiment will now be described with reference to the accompanying drawing.

(1) Configurations of a Processing Device and a Management Board:

FIG. 1 is a block diagram schematically illustrating the hardware and functional configurations of a processing device 1 and a management board 30 of the first embodiment.

The processing device 1 illustrated in FIG. 1 includes a casing 10 that accommodates multiple processors 20 and the single management board 30. An exemplary processor 20 is a server. Hereinafter, the processors 20 are referred to as "servers 20" and the management board 30 is referred to as a "MMB 30" or "board 30".

The casing 10 includes a memory 11 that is capable of storing therein a casing serial number serving as the identification data of the casing 10 and firmware version data of the firmware operating on the MMB 30 in the casing 10. The casing serial number is stored in a casing serial number storing region (identifier data storing region) in the memory 11 and the firmware version data is stored in a version data storing region in the memory 11. At least the firmware version data stored in the version data storing region is overwritable (rewritable) by a writing controller 33b that is to be detailed below. An example of the memory 11 is an Electronic Erasable Programmable Read Only Memory (EEPROM). Hereinafter, the memory 11 is referred to as "casing ROM 11".

The multiple servers 20 are each configured to be, for example, a server blade detachably mounted on the casing 10, and function independently one another.

The MMB 30 manages the servers 20 and shared components, and is also configured to be detachably mounted on the casing 10. The MMB 30 has functions of monitoring voltage, temperature, and fan rotating speed of the casing 10 and controlling the power source, the electric power, and the fan on the basis of the results of the monitoring.

On the MMB 30, a service processor (SP) 33 that enables the firmware to function, a Random Access Memory (RAM) disk 34 and additionally a portable recording medium 31 and a flash memory (non-volatile memory) 32 to be detailed below are mounted. The SP 33 and the RAM disk 34 are used for executing the firmware code (boot code) stored in the flash memory 32.

The portable recording medium 31 is also configured to be detachably mounted on the MMB 30. Examples of the portable recording medium 31 are a Secure Digital (SD) card and a Universal Serial Bus (USB) memory. Hereafter, a portable recording medium 31 is referred to as the "portable medium 31".

The portable medium 31 stores therein the following data pieces (11) through (14):

(11) the code of the firmware operating on the MMB 30 (i.e., the MMB 30 in which the portable medium 31 is placed) that mounts thereon the portable medium 31, which code is compressed data (firmware compressed image) obtained by compressing the firmware code being expanded on the flash memory 32;

(12) setting data of various settings related to the firmware operating on the MMB 30 (i.e., the MMB 30 in which the portable medium 31 is placed) that mounts thereon the portable medium 31;

(13) the serial number of the casing 10 that mounts the MMB 30 (i.e., the MMB 30 in which the portable medium 31 is placed) that mounts thereon the portable medium 31; and

(14) the firmware version data of the firmware operating on the MMB 30 (i.e., the MMB 30 in which the portable medium 31 is placed) that mounts thereon the portable medium 31.

As the above, the portable medium 31 stores therein backup data of the compressed data (11) of the firmware code and the data (12) of various settings of the firmware. The compressed image (11) of the firmware code may include compressed images of multiple generations. The casing serial number (13) and the firmware version data (14) are information with which determination whether the casing ROM 11, the MMB 30, the portable medium 31, and the flash memory 32 that are devices included in the processing device 1 are replaced can be made.

The flash memory 32 stores therein the following data pieces (21) through (24):

(21) the firmware code of the firmware operating on the MMB 30 that mounts thereon the flash memory 32 and is expanded on the flash memory 32;

(22) setting data of various settings related to the firmware operating on the MMB 30 that mounts thereon the flash memory 32;

(23) the serial number of the casing 10 mounting thereon the MMB 30 that mounts thereon the flash memory 32; and

(24) the firmware version data of the firmware operating on the MMB 30 that mounts thereon the flash memory 32.

In the case of failure in the portable medium 31, the data (22) of various settings related to the firmware is stored also in the flash memory 32. Similarly to data pieces (13) and (14), the casing serial number (23) and the firmware version data (24) of the firmware are information with which determination whether the casing ROM 11, the MMB 30, the portable medium 31, and the flash memory 32 that are devices included in the processing device 1 are replaced can be made.

As to be detailed below, when the MMB 30, which for example has a hardware failure, is to be replaced with another MMB 30, the substitute MMB 30 takes over the portable medium 31 that the previous MMB 30 uses, so that the firmware code and the setting data used in the previous MMB 30 are reflected in the substitute MMB 30. If the portable medium 31 is replaced with another portable medium 31, the setting data is read from the flash memory 32 on the board 30 and is then written into the substitute portable medium 31, so that the operation of the processing device 1 can be continued.

The SP 33 on the MMB 30 executes a program held by the memory function of, for example, the RAM disk 34 and thereby functions as a determiner 33a and a writing controller (updating controller) 33b.

The determiner 33a determines, when the device is started for the first time after a component in the device is replaced for the maintenance, whether setting data to be referred by the firmware that is to operate on the MMB 30 is stored in the flash memory 32 or the portable medium 31 on the basis of the casing serial numbers and the firmware version data stored in the casing ROM 11, the flash memory 32, and the portable medium 31. Specifically, the determiner 33a compares the data stored in the three units of the casing ROM 11, the flash memory 32, and the portable medium 31, and determines which device (in this example, either one of the flash memory 32 and the portable medium 31) stores correct data.

Further specifically, the determiner 33a determines, using, for example, the Table T for determining a device storing setting data of FIG. 2, whether the flash memory 32 or the portable medium 31 stores therein setting data to be referred by the firmware that is to operate on the MMB 30. FIG. 2 is a diagram illustrating an example of the Table T for determining a device storing setting data of the first embodiment.

The table T is previously prepared in the firmware and is held by the memory function, such as the RAM disk 34. As illustrated in FIG. 2, the table T includes data of a result of determination (OK or NG), and a place/device (portable medium, flash memory, and none) where setting data to be referred is stored for each of ten patterns 1-10 classified according to the casing serial numbers and the firmware versions stored in the casing ROM 11, the flash memory 32, and the portable medium 31. The result of determination being "NG" represents cases where whether the setting data to be referred by the firmware to be operated on the MMB 30 is stored in the flash memory 32 or the portable medium 31 is indeterminable.

When the processing device 1 is started for the first time after a device component therein is replaced due to maintenance purpose, the determiner 33a reads the casing serial numbers and firmware versions from the casing ROM 11, the flash memory 32, and the portable medium 31. Then the determiner 33a refers to the table T to determine which pattern corresponds to the read casing serial numbers and firmware versions among the patterns 1-10. By referring to the table T, the determiner 33a obtains information about the result of the determination, a place/device where the setting data to be referred by the firmware is stored corresponding to the determined pattern.

In determining the pattern by referring to the table T, the determiner 33a may use both the casing serial numbers and the firmware version data or may use either one of the casing serial numbers and the firmware version data.

The writing controller 33b controls data transferring and writing (updating) among the casing ROM 11, the flash memory 32, and the portable medium 31 on the basis of the results of determination made by the determiner 33a. The functions of the writing controller 33b will be detailed below.

Here, description will now be made in relation to the function of determining of the determiner 33a referring to the table T of FIG. 2 and the function of the writing controller 33b corresponding to the result of determination exerting in each of the ten pattern in the following items (A1) to (A10). In the table T of FIG. 2, the terms S/N(A), S/N(B), and S/N(C) represent values of the casing serial number, the terms of Ver.1 and Ver.2 represent values of the firmware version, and the term of Ver.x represents that the firmware is startup firmware. When the portable medium 31 or the MMB 30 is replaced in the processing device 1, the serial number stored in a new device (i.e., the portable medium 31 or the flash memory 32) is the initial value NULL and the firmware version stored in the new device (i.e., the portable medium 31 or the flash memory 32) is Ver.x.

(A1) Pattern 1:

In the pattern 1, the casing serial number on the portable medium 31 is the same as that on the casing ROM 11, and also the casing serial number on the flash memory 32 is the initial value (NULL). Concurrently, the firmware version on the portable medium 31 is the same as that on the casing ROM 11 and the firmware version on the flash memory 32 is Ver.x, which represents startup firmware.

The pattern 1 therefore corresponds to a case where the MMB 30 is new and has been replaced for the previous board 30, onto which the portable medium 31 that has been mounted on the previous MMB 30 that has been used before the replacement is mounted and used. In this case, a flash memory 32 mounted on the new board 30 does not store therein setting data of the firmware. For the above, the setting data of the firmware which is stored in the portable medium 31 that has been mounted on the previous MMB 30 used before the replacement and which is related on the firmware of the previous MMB 30 is also taken over by the new board 30. Accordingly, the data to be referred by the firmware is the setting data on the portable medium 31. This means that, as illustrated in the table T, the device where the setting data to be referred by the firmware is stored in the pattern 1 is the portable medium 31.

Accordingly, when the casing serial number on the portable medium 31 mounted on the MMB 30 is the same as that on the casing ROM 11 and also the casing serial number on the flash memory 32 is the initial value (NULL), the determiner 33a determines that a new MMB 30 is new and has been replaced for the previous MMB 30. Specifically, the determiner 33a refers to the table T, and determines that the processing device 1 is in a state corresponding to the pattern 1 and that the setting data to be referred by the firmware is stored in the portable medium 31 (see FIG. 4, YES route of step S13 to step S14).

In the state of the pattern 1, the writing controller 33b reads the setting data of various settings stored in the portable medium 31 and writes the read setting data into the flash memory 32 being mounted on the new MMB 30 (see steps S14 and S15). Thereby, the setting data of various settings is written into the flash memory 32 and is backed up in the portable medium 31.

In the pattern 1, the firmware version on the portable medium 31 is different from data (Ver.x) in the version data storing region in the flash memory 32 being mounted on the new MMB 30. For the above, the writing controller 33b overwrites the data in the version data storing region of the flash memory 32 with the firmware version on the portable medium 31, and updates the flash memory 32 with the firmware code obtained by decompressing the compressed data on the portable medium 31 (see FIG. 4, step S17). The procedure of writing the firmware code when the flash memory 32 are duplicated into two partitions #1 and #2 to store data will be detailed below with reference to FIGS. 5 and 6.

Figure 4:
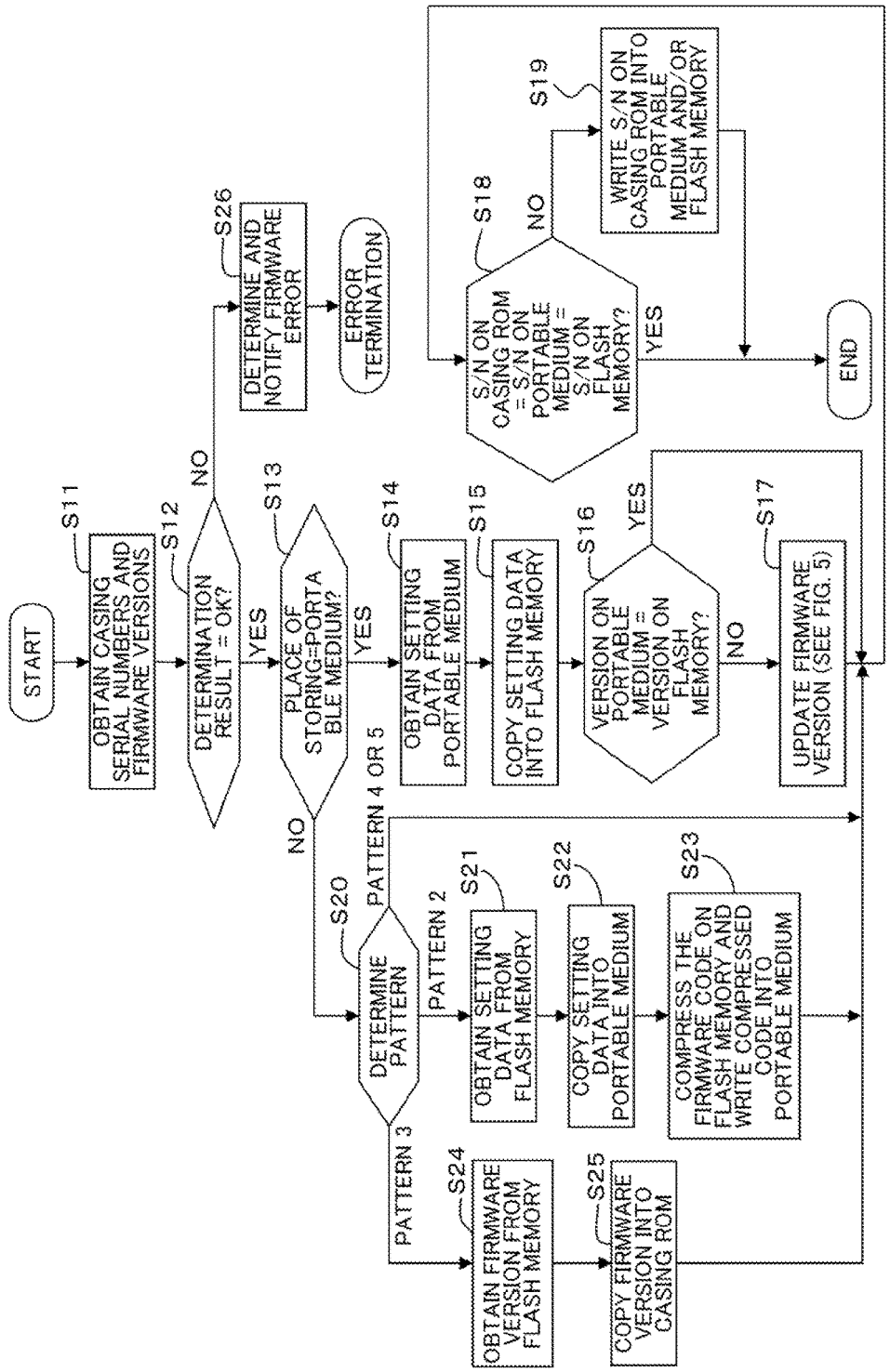
FIG. 4 is a flow diagram illustrating a succession of procedural steps performed by a determiner and a writing controller disposed in a management board of the first embodiment.

Since the casing serial number on the portable medium 31 is the same as that on the casing ROM 11 and also the casing serial number on the flash memory 32 is the initial value (NULL) in the pattern 1, the writing controller 33b overwrites the casing serial number in the casing serial number storing region of the flash memory 32 with the casing serial number on the casing ROM 11 (see FIG. 4, step S19.

(A2) Pattern 2:

In the pattern 2, the casing serial number on the casing ROM 11 is the same as that on the flash memory 32 while the casing serial number on the portable medium 31 is the initial number (NULL). Consequently, the firmware version on the casing ROM 11 is the same as that on the flash memory 32 and the firmware version on the portable medium 31 is Ver.x, which represents the startup firmware.

The pattern 2 therefore corresponds to a case where the portable medium 31 is new and has been replaced for the previous portable medium 31 having been mounted on the MMB 30. In this case, the new portable medium 31 does not store therein the setting data of the firmware while the flash memory 32 being mounted on the MMB 30 stores therein the setting data of the firmware. Accordingly, the setting data to be referred by the firmware is the setting data being stored in the flash memory 32. This means that, as illustrated in the table T, the device where the setting data to be referred by the firmware is stored in the pattern 2 is the flash memory 32.

Accordingly, when the casing serial number on the casing ROM 11 is the same as that on the flash memory 32 while the casing serial number on the portable medium 31 mounted on the MMB 30 is the initial number (NULL), the determiner 33a determines that a new portable medium 31 is replaced for the previous portable medium 31. Specifically, the determiner 33a refers to the table T and determines that the processing device 1 is in a state corresponding to the pattern 2 and that the setting data to be referred by the firmware is stored in the flash memory 32 (see FIG. 4, step S13 and from step S20 to step S21).

In the state of the pattern 2, the writing controller 33b reads data of various settings stored in the flash memory 32 and writes the read setting data into the new portable medium 31 being mounted onto the MMB 30 after the replacement (see FIG. 4, steps S21 and S22). Thereby, the setting data of various settings on the flash memory 32 is backed up in the portable medium 31.

In the pattern 2, the firmware version data (Ver.x) in the version data storing region on the new portable medium 31 being mounted onto the MMB 30 after the replacement is different from the firmware version on the flash memory 32. For the above, the writing controller 33b overwrites the firmware version data in the version data storing region of the new portable medium 31 with the firmware version on the flash memory 32, and updates the new portable medium 31 with the compressed code obtained by compressing the firmware code on the flash memory 32 (see FIG. 4, step S23).

Since the casing serial number on the casing ROM 11 is the same as that on the flash memory 32 while the casing serial number on the new portable medium 31 being mounted after the replacement is the initial number (NULL) in the pattern 2, the writing controller 33b overwrites the data in the casing serial number storing region of the new portable medium 31 with the casing serial number on the casing ROM 11 (see FIG. 4, step S19).

(A3) Pattern 3:

In the pattern 3, the casing serial number on the flash memory 32 is the same as that on the portable medium 31 while the casing serial number on the casing ROM 11 is different from those on the flash memory 32 and the portable medium 31, and also the firmware version on the casing ROM 11 is the initial value (NULL). In addition, the firmware version on the portable medium 31 is the same as that on the flash memory 32.

The pattern 3 therefore corresponds to a case where the casing ROM 11 is new and has been replaced for the previous casing ROM 11, in which a new casing serial number different from those stored in the portable medium 31 or the flash memory 32 is previously stored. In this case, the portable medium 31 and the flash memory 32 store therein the same casing serial number, the same firmware version, and the same setting data. Accordingly, the setting data to be referred by the firmware may be the setting data being stored in the flash memory 32 or the portable medium 31, and the first embodiment assumes the setting data to be referred by the firmware is read from the flash memory 32. This means that, as illustrated in the table T, the device where the setting data to be referred by the firmware is stored in the pattern 3 is the flash memory 32.

Accordingly, when the casing serial number on the flash memory 32 is the same as that on the portable medium 31 being mounted on the MMB 30 while the casing serial number on the casing ROM 11 is different from those on the flash memory 32 and the portable medium 31, and also the firmware version on the casing ROM 11 is the initial value (NULL), the determiner 33a determines that the casing ROM 11 is new and has been replaced with the previous casing ROM 11. Specifically, the determiner 33a refers to the table T and determines that the processing device 1 is in a state corresponding to the pattern 3 and that the setting data to be referred by the firmware is stored in the flash memory 32 (see FIG. 4, step S13 and from step S20 to step S24).

In the pattern 3, the firmware version of the new casing ROM 11 used after the replacement is the initial value (NULL). For the above, the writing controller 33b reads the firmware version from the flash memory 32 (or the portable medium 31) and writes the read firmware version into the firmware version storing region of the casing ROM 11 (see FIG. 4, steps S24 and S25).

Since the new casing ROM 11 used after the replacement stores therein a new casing serial number in the pattern 3, the writing controller 33b is not allowed to rewrite the new casing serial number of the new casing ROM 11. Therefore, the writing controller 33b reads the casing serial number from the new casing ROM 11 and overwrites the casing serial numbers in the casing serial number storing regions of the flash memory 32 and the portable medium 31 with the read casing serial number (see FIG. 4, step S19).

(A4) Pattern 4:

In the pattern 4, the casing serial number on the flash memory 32 and that on the portable medium 31 are both the initial values (NULL), and the casing ROM 11 stores therein the serial number of the casing 10. The firmware versions on the casing ROM 11, the flash memory 32, and the portable medium 31 are all the same.

The pattern 4 therefore corresponds to a state (initial starting) where the processing device 1 is powered on for the first time from the default state. In this case, the portable medium 31 and the flash memory 32 store therein, the same firmware version, and the same setting data. Accordingly, the setting data to be referred by the firmware may be the setting data being stored in the flash memory 32 or the portable medium 31, and the first embodiment assumes the setting data to be referred by the firmware is read from the flash memory 32. This means that, as illustrated in the table T, the device where the setting data to be referred by the firmware is stored in the pattern 4 is the flash memory 32.

Accordingly, when the casing serial number on the flash memory 32 and that on the portable medium 31 being mounted on the MMB 30 are both the initial values (NULL) and also the casing ROM 11 stores therein the serial number of the casing 10, the determiner 33a determines that the processing device 1 is powered on for the first time from the default state. Specifically, the determiner 33a refers to the table T, and determines that the processing device 1 is in a state corresponding to the pattern 4 and that the setting data to be referred by the firmware is stored in the flash memory 32 (see FIG. 4, step S13 and from step S20 to step S18).

Since the casing serial number on the flash memory 32 and that on the portable medium 31 are both the initial values (NULL) in the pattern 4, the writing controller 33b reads the casing serial number from the casing ROM 11 and overwrites the casing serial numbers in the casing serial number storing regions of the flash memory 32 and the portable medium 31 with the read casing serial number (see FIG. 4, step S19).

(A5) Pattern 5:

In the pattern 5, the casing serial number on the flash memory 32 is the same as those on the portable medium 31 and the casing ROM 11, and also the firmware versions on the casing ROM 11, the flash memory 32, and the portable medium 31 are all the same.

The pattern 5 therefore corresponds to a state where the processing device 1 is restarted, that is, when the AC power source of the casing 10 is switched from the off-state to the on-state. In this case likewise the pattern 3, the portable medium 31 and the flash memory 32 store therein the same casing serial number, the same firmware version, and the same setting data. Accordingly, the setting data to be referred by the firmware may be the setting data being stored in the flash memory 32 or the portable medium 31, and the first embodiment assumes the setting data to be referred by the firmware is read from the flash memory 32. This means that, as illustrated in the table T, the device where the setting data to be referred by the firmware is stored in the pattern 5 is the flash memory 32.

Accordingly, when the casing serial number on the flash memory 32 is the same as that on the portable medium 31 being mounted on the MMB 30 and that on the casing ROM 11, the determiner 33a determines that the processing device 1 is in a state of being restarted. Specifically, the determiner 33a refers to the table T, and determines that the processing device 1 is in a state corresponding to the pattern 5 and that the setting data to be referred by the firmware is stored in the flash memory 32 (see FIG. 4, step S13 and from step S20 to step S18).

(A6) Pattern 6:

In the pattern 6, the casing serial number on the casing ROM 11 is the same as that on the portable medium 31 and also the casing serial number on the flash memory 32 is different from those on the casing ROM 11 and the portable medium 31. Concurrently, the firmware version on the casing ROM 11 is the same as that on the portable medium 31 and the also the firmware version on the flash memory 32 is different from those on the casing ROM 11 and the portable medium 31.

The pattern 6 therefore corresponds to a case where the MMB 30 has been used in another casing 10 and replaced for a previous MMB 30 and the portable medium 31 having been mounted on the previous MMB 30 has been mounted on the MMB 30 used after the replacement. In this case, the flash memory 32 being mounted on the MMB 30 used after the replacement does not store therein the setting data of the firmware having operated on the previous MMB 30. For the above, the setting data of the firmware on the previous MMB 30 which setting data is stored in the portable medium 31 having been mounted on the previous MMB 30 is taken over to the MMB 30 used after the replacement. Accordingly, the setting data to be referred by the firmware is the setting data stored in the portable medium 31. Specifically, as illustrated in the table T, the device where the setting data to be referred by the firmware is stored in the pattern 6 is the portable medium 31.

Accordingly, when the casing serial number on the casing ROM 11 is the same as that on the portable medium 31 being mounted on the MMB 30 but the casing serial number of the flash memory 32 is different from those on the casing ROM 11 and the portable medium 31, the determiner 33a determines that the MMB 30 has been used in another casing 10 and replaced for the previous MMB 30. Specifically, the determiner 33a refers to the table T, and determines that the setting data to be referred by the firmware is stored in the portable medium 31 (see FIG. 4, from step S13 to step S14).

In the state of the pattern 6, the writing controller 33b reads the setting data of various settings from the portable medium 31 and writes the read setting data into the flash memory 32 being mounted on the MMB 30 used after the replacement (see FIG. 4, steps S14 and S15). Thereby, the setting data of various settings is written into the flash memory 32 and is backed up in the portable medium 31.

In the pattern 6, the firmware version on the portable medium 31 is different from that the flash memory 32 being mounted on the MMB 30 used after the replacement. For the above, the writing controller 33b overwrites the data in the version data storing region of the flash memory 32 with the firmware version on the portable medium 31 and updates the flash memory 32 with the firmware code obtained by decompressing the compressed data on the portable medium 31 (see FIG. 4, step S17). The procedure of writing the firmware code when the flash memory 32 are duplicated into two partitions #1 and #2 to store data will be detailed below with reference to FIGS. 5 and 6.

Since the casing serial number on the portable medium 31 is the same as that on the casing ROM 11 and also the casing serial number on the flash memory 32 is different from those of the casing ROM 11 and the portable medium 31 in the pattern 6, the writing controller 33*b* overwrites the data in the casing serial number storing region of the flash memory 32 with the casing serial number on the casing ROM 11 (see FIG. 4, step S19).

(A7) Pattern 7:

In the pattern 7, the casing serial number on the casing ROM 11 is the same as that on the flash memory 32 and also the casing serial number of the portable medium 31 is different from those of the casing ROM 11 and the flash memory 32. Concurrently, the firmware version on the casing ROM 11 is the same as that on the flash memory 32 and also the firmware version of the portable medium 31 is different from those on the casing ROM 11 and the flash memory 32.

This pattern 7 corresponds to a case where, in replacing the portable medium 31 mounted on the MMB 30 with a new portable medium 31 likewise the pattern 2, a portable medium 31 that has been used in another casing 10 is erroneously mounted onto the MMB 30, which is usually caused by mistaken in user operation. The new portable medium 31 being mounted on the MMB 30 after the replacement stores therein the serial number of the different casing 10 and the firmware version that operates on the MMB 30 mounted on the different casing 10.

In this case, whether the data on the portable medium 31 or the data on the casing ROM 11 and the flash memory 32 is correct data for the processing device 1 is indeterminable in the determiner 33*a*. Specifically, determiner 33*a* is not able to determine whether the setting data to be referred by the firmware to operate on the MMB 30 is stored in the flash memory 32 or the portable medium 31. Accordingly, the determiner 33*a* refers to the table T, and determines, when the casing serial numbers and the firmware versions are in the state of the pattern 7, firmware error (NG).

(A8) Pattern 8:

In the pattern 8, the casing serial number on the casing ROM 11 is different from that on the portable medium 31 while the casing serial number on the flash memory 32 in the initial value (NULL). The firmware version on the casing ROM 11 is different from that on the portable medium 31 and the firmware version on the flash memory 32 is Ver.x, which represents the startup firmware.

The pattern 8 corresponds to a case where, in replacing the previous MMB 30 with a new MMB 30 and mounting the portable medium 31 having been mounted on the previous MMB 30 onto the new MMB 30 likewise the pattern 1, a portable medium 31 that has been used in another casing 10 is erroneously mounted onto the new MMB 30, which is usually caused by mistaken in user operation. The portable medium 31 being mounted on the new MMB 30 used after the replacement stores therein the serial number of the different casing 10 and the firmware version that operates on the MMB 30 mounted on the different casing 10.

In this case, whether the data on the portable medium 31 or the data on the casing ROM 11 is correct data for the processing device 1 is indeterminable in the determiner 33*a*. Specifically, determiner 33*a* is not able to determine whether the setting data to be referred by the firmware to operate on the MMB 30 is stored in the portable medium 31. Accordingly, the determiner 33*a* refers to the table T and determines, when the casing serial numbers and the firmware versions are in the state of the pattern 8, firmware error (NG).

(A9) Pattern 9:

In the pattern 9, the casing serial number on the casing ROM 11 is different from that on the flash memory 32 and the casing serial number on the portable medium 31 is the initial value (NULL). Concurrently, the firmware version on the casing ROM 11 is different from that on the flash memory 32 and the firmware version on the portable medium 31 is Ver.x, which represents the startup firmware.

The pattern 9 corresponds to a case where, in replacing the portable medium 31 and the MMB 30, the portable medium 31 is new and has been replaced for the previous portable medium 31, and the MMB 30 has been used in a different casing 10 and has been replaced for the previous MMB 30, which is usually caused by mistaken in user operation. The flash memory 32 being mounted on the MMB 30 used after the replacement stores therein the serial number of the different casing 10 and the firmware version that operates on the MMB 30 mounted on the different casing 10. The portable medium 31 mounted after the replacement stores therein the initial value (NULL) for the casing serial number and Ver.x, which represents the startup firmware for the firmware version.

In this case, whether the data on the flash memory 32 or the data on the casing ROM 11 is correct data for the processing device 1 is indeterminable in the determiner 33*a*. Specifically, determiner 33*a* is not able to determine whether the setting data to be referred by the firmware to operate on the MMB 30 is stored in the flash memory 32. Accordingly, the determiner 33*a* refers to the table T, and determines, when the casing serial numbers and the firmware versions are in the state of the pattern 9, firmware error (NG).

(A10) Pattern 10:

In the pattern 10, the casing serial number on the portable medium 31 is the same as that on the flash memory 32, but the casing serial number of the casing ROM 11 is different from those on the portable medium 31 and the flash memory 32. Concurrently, the firmware version on the portable medium 31 is the same as that on the flash memory 32 but the firmware version on the casing ROM 11 is different from those on the portable medium 31 and the flash memory 32.

The pattern 10 corresponds to a case where, in replacing of, for example, the portable medium 31 and the MMB 30, the portable medium 31 and the MMB 30 that have been used in a different casing 10 are replaced with the previous portable medium 31 and the previous MMB 30, which is usually caused by mistaken in user operation. The flash memory 32 mounted on the MMB 30 used after the replacement stores therein the casing serial number of the casing 10 and the firmware version of the firmware operating on the different casing 10. Also the portable medium 31 used after the replacement stores therein the casing serial number of the casing 10 and the firmware version of the firmware operating on the different casing 10.

In this case, whether the data on the portable medium 31 and the flash memory 32 or the data on the casing ROM 11 is correct data for the processing device 1 is indeterminable in the determiner 33*a*. Specifically, determiner 33*a* is not able to determine whether the setting data to be referred by the firmware to operate on the MMB 30 is stored in the portable medium 31 and the flash memory 32. Accordingly, the determiner 33*a* refers to the table T, and determines, when the casing serial numbers and the firmware versions are in the state of the pattern 10, firmware error (NG).

In the above patterns 7-10, when the determiner 33a determines that firmware error is occurring (result of determination: NG) with reference to the table T, the service processor 33 makes the firmware into the fallback state and encourages the user in maintenance. For the notification of the above firmware error to the user, the processing device 1 has a displaying function by means of, for example, lighting and flashing an LED lamp or another notification function by means of voice or alarm sound, which functions however not appeared in the drawings.

(2) Operation of the Processing Device and the Management Board:

Next, description will now be made in relation to the processing device 1 and the MMB 30 configured as the above with reference to FIGS. 3-6.

(2-1) Operation of the Processing Device (Management Board):

First of all, schematic description will now be made in relation to operation performed as starting the processing device 1 (MMB 30) of the first embodiment with reference to flow diagram (steps S1-S4) of FIG. 3.

When the processing device 1 is powered on (step S1), the MMB 30 starts the firmware using the flash memory 32 being mounted on the MMB 30 (step S2). After that, the SP 33 obtains the casing serial numbers and firmware versions from the casing ROM 11, the portable medium 31, and the flash memory 32. Then, the SP 33 (determiner 33a and writing controller 33b) carries out predetermined determination and data writing to be detailed below along the table T in FIG. 2 and the procedure of FIG. 4 (step S3). If each determined matter has no problem as the result of determination, the MMB 30 starts the system management, that is, activates the multiple servers (step S4).

(2-2) Operation by the Determiner and the Writing Controller in the Management Board:

Next, description will now be made in relation to operation at step S3 of FIG. 3, that is, operation performed by the determiner 33a and the writing controller 33b in the MMB 30 of the first embodiment, will now be described along the flow diagram (steps S11-S26) of FIG. 4.

To begin with, the SP 33 obtains the casing serial numbers and the firmware versions from the casing ROM 11, the portable medium 31, and the flash memory 32 (step S11). The determiner 33a compares the obtained casing serial numbers and firmware versions with the patterns on the table T of FIG. 2, and determines the pattern corresponding to the obtained casing serial numbers and firmware versions (steps S12, S13, and S20).

Specifically, the determiner 33a determines, on the basis of the table T, whether determination as to whether the setting data to be referred by the firmware to be operated on the MMB 30 is stored in the flash memory 32 or the portable medium 31 can be made (step S12). This means that, the determiner 33a determines that the device where the setting data is stored is determinable (OK) when the corresponding pattern is one from patterns 1-6 but is indeterminable (NG) when the corresponding pattern is one from patterns 7-10.

When the device where the setting data is stored is determined to be indeterminable (NG) (NO route in step S12), the SP 33 determines that a firmware error occurs and makes the firmware into the fallback state and notifies the user of firmware error to encourage the user in maintenance (step S26).

In contrast, the place/device where the setting data is stored is determined to be determinable (OK) (YES route in step S12), the determiner 33a determines, on the basis of the table T, whether the device where the setting data to be referred by the firmware is stored is the flash memory 32 or the portable medium 31 (step S13). Specifically, under a state of the pattern 1 or 6, the determiner 33a determines that the setting data to be referred is stored in the portable medium 31 while under a state of one of the patterns 2-5, the determiner 33a determines that the setting data to be referred is stored in the flash memory 32.

When the setting data to be referred is determined to be stored in the portable medium 31 (YES route in step S13), the procedure is then carried out along the steps S14 through S19. Specifically, the writing controller 33b reads the setting data of various setting from the portable medium 31 (step S14) and writes the read setting data into the flash memory 32 (step S15), so that the setting data of the various settings is written into the flash memory 32 and the backed up by the portable medium 31.

Then the determiner 33a determines whether the firmware version on the portable medium 31 is the same as that on the flash memory 32 (step S16). When the firmware version on the portable medium 31 is the same as that on the flash memory 32 (YES route in step S16), the procedure moves to step S18. In contrast, when the firmware version on the portable medium 31 is different from that on the flash memory 32 (NO route in step S16), the writing controller 33b reads the firmware version from the portable medium 31 and updates the firmware version on the flash memory 32 by writing the read firmware version into the version data storing region of the flash memory 32. In addition, the writing controller 33b reads the compressed data from the portable medium 31 and decompresses the read compressed data into a firmware code, which is written into the flash memory 32 to update the firmware code in the flash memory 32 (step S17). The procedure of writing and updating of the firmware code in step S17 will be detailed below with reference to FIGS. 5 and 6.

After that, the determiner 33a further determines whether the casing serial number on the casing ROM 11 is the same as those on the portable medium 31 or the flash memory 32 (step S18). When at least one of the casing serial numbers on the portable medium 31 and the flash memory 32 is different from that on the casing ROM 11 (NO route in step S18), the casing serial number is read from the casing ROM 11. The writing controller 33b overwrites the data in the casing serial number storing regions of the portable medium 31 and/or the flash memory 32 which store casing serial numbers different from that on the casing ROM 11 with the read casing serial number on the casing ROM 11 (step S19).

After the overwriting of the casing serial number is completed at step S19 or when three casing serial numbers are the same (YES route in step S18), the determination by the determiner 33a and the data writing by the writing controller 33b (collectively referred to as firmware starting) are completed. The firmware on the MMB 30 starts, using the setting data on the flash memory 32, the system management (service providing) of the processing device 1 including multiple servers 20.

On the other hand, when the setting data to be referred is determined to be stored in the flash memory 32 (NO route in step S13), the determiner 33a determines which pattern is the corresponding pattern (step S20).

When the casing serial numbers and the firmware versions obtained in step S11 correspond to the pattern 2 (Pattern 2 route in step S20), the procedure is carried out along the steps S21-S23, S18, and S19. Specifically, the writing controller 33b reads setting data of various settings from the flash memory 32 (step S21) and writes the read setting data into the portable medium 31 (step S22). Thereby, the setting data of the various settings on the flash memory 32 is backed up by the portable medium 31.

Next, the writing controller 33b reads the firmware version on the flash memory 32 and overwrites the data in the version data storing region of the portable medium 31 with the read version data. The writing controller 33b reads the firmware code on the flash memory 32 and compresses the read code into compressed data, which is then written into the portable medium 31 (step S23). After that, the procedure carried out by the determiner 33a and the writing controller 33b moves to the steps S18 and S19.

When the casing serial numbers and firmware versions obtained in step S11 correspond to the pattern 3 ("pattern 3" route in step S20), the procedure is carried out along the steps S24, S25, S18 and S19. Namely, the writing controller 33b reads the firmware version on the flash memory 32 (step S24) and writes the read firmware version into the version data storing region of the casing ROM 11 (step S25). After that, the procedure performed by the determiner 33a and the writing controller 33b moves to steps S18 and S19. Between steps S25 and S18, the same process as the steps S21 to S23 may be carried out.

When the casing serial and firmware versions obtained in step S11 correspond to the pattern 4 or 5 ("pattern 4 or 5" route in step S20), the procedure performed by the determiner 33a and the writing controller 33b moves to steps S18 and S19. Before moving to step S18, the same process as the steps S21 and S23 may carry out.

Figure 5:
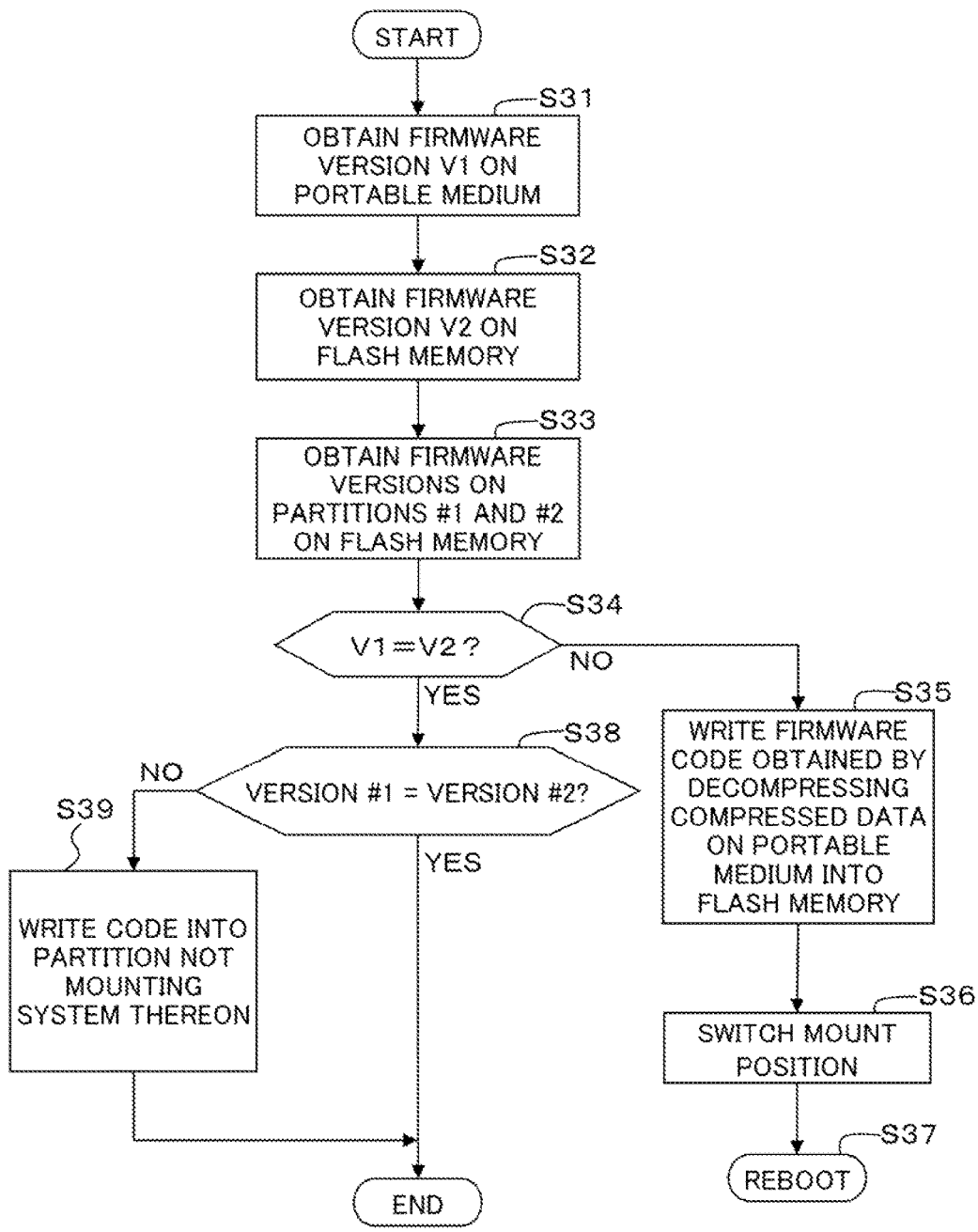
FIG. 5 is a flow diagram illustrating a succession of procedural steps of updating a firmware version in the first embodiment.
Figure 6:
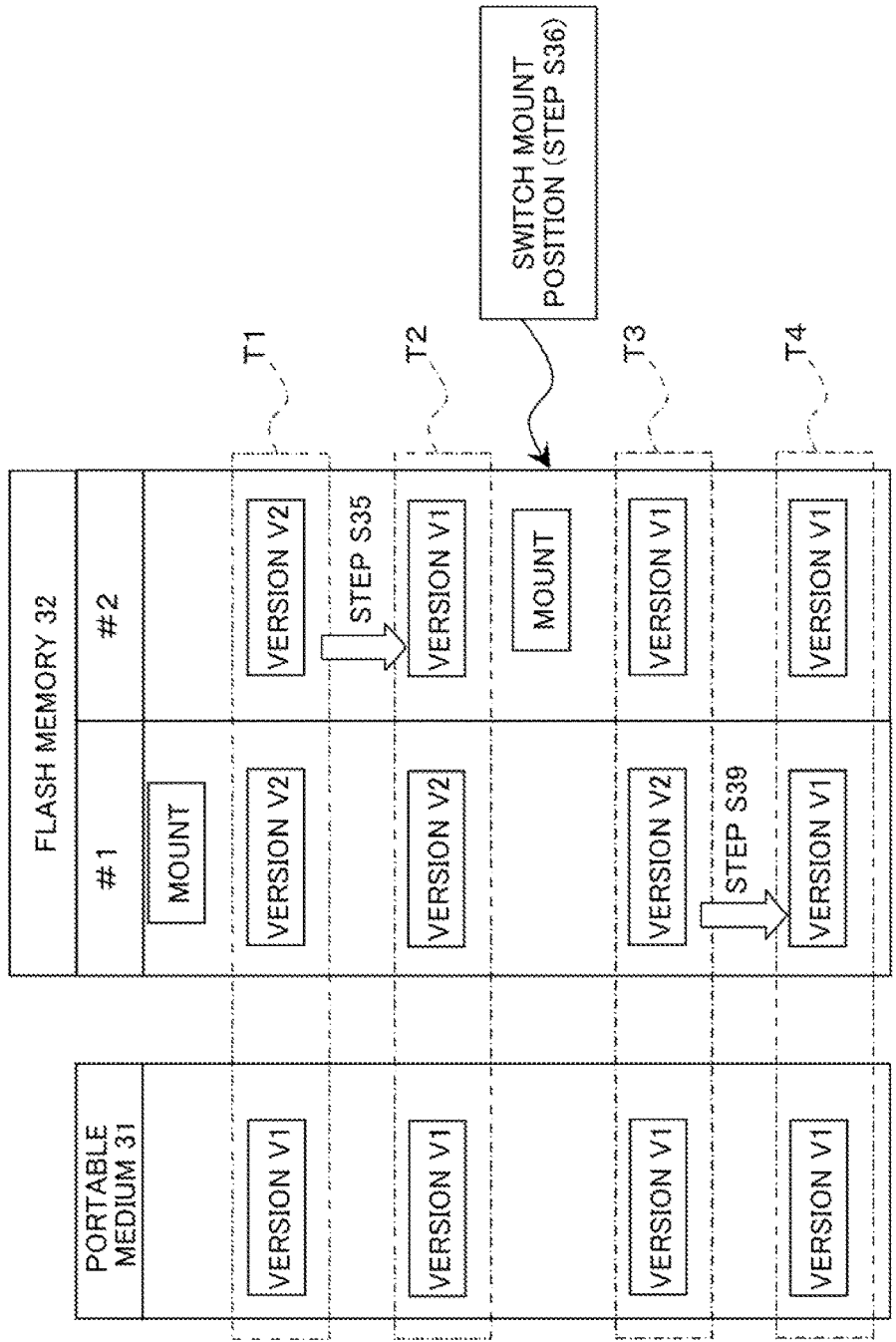
FIG. 6 is a flow diagram illustrating updating a firmware version in the first embodiment.

Next, detailed description will now be made in relation to the procedure of writing and updating the firmware code (firmware version updating) performed by the writing controller 33b at the step S17 of FIG. 4 along the flow diagram (steps S31-S39) in FIG. 5 with reference to FIG. 6. FIGS. 5 and 6 illustrate a procedure of writing and updating a firmware when data stored in the flash memory 32 is duplicated into the partitions #1 and #2 to store data. Here, as illustrated in FIG. 6, the partition #1 is assumed to mount thereon the system when the processing device 1 is started for the first time after the board has been replaced.

First of all, the writing controller 33b obtains the firmware version V1 on the portable medium 31 that is taken over from the previous board 30 (the board used before the replacement) (step S31). The writing controller 33b also obtains the firmware version V2 (startup firmware version Ver.x in the pattern 1) of the firmware currently operating on the current board 30 used after the replacement from the flash memory 32 being mounted on the current MMB 30 (step S32). At that time, the firmware version V2 is obtained from the partition #1, on which the system is being mounted. Furthermore, the writing controller 33b obtains the firmware versions of the firmware codes stored in the two partitions #1 and #2 of the flash memory 32 (step S33). The firmware versions of the partition #1 and that of the #2 which versions are obtained at this time (i.e., starting the processing device 1 for the first time after the board has been replaced) are both the same as the firmware version V2 that is obtained at step S32 (see T1 in FIG. 6). Then the writing controller 33b compares the firmware versions V1 and V2 obtained at steps S31 and S32, respectively (step S34).

At the time the system including the processing device 1 is started for the first time after the board has been replaced, the firmware version V1 on the portable medium 31 is different from the firmware version V2 on the flash memory 32 (NO route in step S34, see T1 in FIG. 6). For the above, the writing controller 33b writes the firmware version V1 into the partition V2, on which the system is not currently being mounted, and also writes the firmware code corresponding to the firmware version V1 into the partition #2 (step S35, see T2 in FIG. 6). Thereby, the partition #2 is updated from the firmware version V2 to the firmware version V1. The firmware code written into the partition #2 is obtained by reading and decompressing the decompressed code on the portable medium 31. After that, the mount position that the system is mounted thereon is changed from the partition #1 to the partition #2 (step S36, see "mount position" in FIG. 6) and then the system is rebooted (step S37).

When the system is restarted, the firmware version V1 on the portable medium 31 that is taken over from the previous board 30 is obtained (step S31) in the same manner as performed when the system is started for the first time. The writing controller 33b also obtains the firmware version V1 of the firmware currently operating on the current board 30 used after the replacement from the flash memory 32 being mounted on the current board 30 (step S32). At that time, the firmware version V1 is obtained from the partition #2, on which the system is being mounted. Furthermore, the writing controller 33b obtains the firmware versions of the firmware codes stored in the two partitions #1 and #2 of the flash memory 32 (step S33). The firmware versions of the partition #1 and that of the partition #2 which versions are obtained when the system is restarted are V2 and V1, respectively (see T3 in FIG. 6). Then the writing controller 33b compares the firmware versions V1 and V1 obtained at steps S31 and S32, respectively (step S34).

When the system is restarted, the firmware versions on the portable medium 31 and the flash memory 32 are both V1 (YES route in step S34, see T3 in FIG. 6). In this case, the writing controller 33b compares the firmware versions V2 and V1 respectively obtained from the two partitions #1 and #2 at the step S33 (step S38). At that time, since the firmware version V2 on the partition #1 is different from the firmware version V1 on the partition #2 (NO route in step S38), the writing controller 33b writes the firmware version V1 and the firmware code corresponding to the firmware version V1 into the partition #1, on which the system is not currently mounting (step S39, see T4 in FIG. 6). Thereby, the partition #1 is also updated from the firmware version V2 to the firmware version V1. The firmware version written into the partition #1 may be obtained from the partition #2 or obtained by reading and decompressing the compressed code on the portable medium 31.

The firmware versions and the firmware codes in the two partitions #1 and #2 of the flash memory 32 are updated to be the same as the firmware version and the firmware code on the portable medium 31. Completion of the updating makes the current board 30 to provide service (i.e., management of the multiple servers 20) using the same version of the firmware as that used in the previous board 30.

(2-3) Detailed Example of Determining and Updating:

Hereinafter, detailed examples of determining and updating in each of the patterns 1-10 of the table T will now be described with reference to steps S11-S26 of FIG. 4.

(B1) Pattern 1:

The pattern 1 corresponds to a case where the MMB 30 which has for example a hardware failure is to be replaced with a new board 30. In this case, the operator detaches the failed MMB 30 from the slot of the casing 10 and further detaches the SD card (portable medium) 31 that has been mounted on the failed board 30. Then the operator mounts on the same SD card 31 onto a new board 30 and inserts the new board 30 into the slot of the casing 10. After this replacement, the operator starts the processing device 1 (MMB 30).

When the new board 30 is started, the firmware firstly obtains the casing serial number SN1 stored in the casing ROM 11 (step S11) and also the casing serial number SN3 stored in the flash memory 32 on the board 30 and the casing serial number SN2 stored in the SD card 31 (step S11). When the casing serial number SN1 stored in the casing ROM 11 is "SN012345", the SD card 31, which has been used on the same casing and is taken over by the new board 30, has the same serial number SN2 "SN012345". In contrast, since the board 30 is new and the SN3 on the flash memory 32 is the initial value (NULL). Accordingly, the combination of the obtained serial numbers SN1 to SN3 corresponds to the pattern 1 on the table T. The result of the determination by the determiner 33a is OK (Yes route in step S12) and the data to be referred is therefore determined to be stored in the SD card 31 (YES route in step S13).

Then, the firmware (writing controller 33b) obtains operation setting data from the SD card 31 (step S14) and copies the obtained operation setting data into the storing region in the flash memory 32 (step S15). Next, the firmware compares the version of the compressed data of the firmware code stored in the SD card 31 with the version of the firmware code expanded on the flash memory 32 (step S16). If the two versions are the same (YES route in step S16), the firmware moves to the next process (step S18). On the other hand, if the two versions are different from each other (NO route in step S16), the firmware starts writing the firmware data on the SD card 31 into the flash memory 32 (step S17). Here, if the flash memory 32 is duplicated into two partitions, the data writing into the flash memory 32 is carried out along the procedure detailed as the above with reference to FIGS. 5 and 6.

Finally, the casing serial number SN1 stored in the casing ROM 11 is compared with the casing serial number SN2 stored in the SD card 31 and the casing serial number SN3 stored in the flash memory 32 (step S18). In the pattern 1, the casing serial number SN3 stored in the flash memory 32 is the initial value (NULL), which is therefore different from "SN012345" representing the casing serial numbers SN1 and SN2 (NO route in step S18). For the above, the SN1 "SN012345" on the casing ROM 11 is overwritten data in the storing region of the flash memory 32 with (step S19). Since the SN2 on the SD card 31 is the same as the SN1 on the casing ROM 11, the SN2 is not overwritten with the SN1.

When the above procedure is completed, the flash memory 32 in the new board 30 expands therein the firmware code of the same version as the firmware used in the previous board 30, which has been replaced with the new board 30, and also takes over the same operation setting data as that used in the previous board 30. This makes the new board 30 possible to provide service (i.e., managing the multiple servers 20) using the firmware version and the operation setting data that are the same as those used in the previous board 30.

(B2) Pattern 2:

The pattern 2 corresponds to a case where the SD card 31 which has a hardware failure is to be replaced with a new SD card 31. In this case, the operator detaches the MMB 30 from the slot of the casing 10 and further detaches the failed SD card (portable medium) 31 that has been mounted on the MMB 30. Then the operator mounts a new SD card 31 onto the board 30 and inserts the board 30 into the slot of the casing 10. After this replacement, the operator starts the processing device 1 (MMB 30).

When the board 30 mounting thereon the new SD card 31 is started, the firmware firstly obtains the casing serial number SN1 stored in the casing ROM 11, the casing serial number SN2 stored in the SD card 31, and the casing serial number SN3 stored in the flash memory 32 (step S11). When the casing serial number SN1 stored in the casing ROM 11 is "SN012345", since the board 30, which has been used on the same casing 10 and is not replaced, the casing serial number SN3 stored in the flash memory 32 is also "SN012345". In contrast, since the SD card 31 is new and has been replaced for the previous SD card 31, the SN2 on the SD card 31 is the initial value (NULL). Accordingly, the combination of the obtained serial numbers SN1 to SN3 corresponds to the pattern 2 on the table T. The result of the determination by the determiner 33a is OK (YES route in step S12) and the data to be referred is therefore determined to be stored in the flash memory 32 (NO route in step S13). The procedure then moves to step S21 ("pattern 2" route in step S20).

The firmware (writing controller 33b) obtains operation setting data from the flash memory 32 (step S21) and copies the obtained operation setting data into the storing region in the SD card 31 (step S22). Furthermore, the firmware further compresses the firmware code being expanded on the flash memory 32 and stores the compressed code (compressed data) into the SD card 31 (step S23).

Finally, the casing serial number SN1 stored in the casing ROM 11 is compared with the casing serial number SN2 stored in the SD card 31 and the casing serial number SN3 stored in the flash memory 32 (step S18). In the pattern 2, the casing serial number SN2 stored in the SD card 31 is the initial value (NULL) and is therefore different from "SN012345" representing the casing serial numbers SN1 and SN3 (NO route in step S18). For the above, the SN1 "SN012345" on the casing ROM 11 is overwritten data in the storing region of the SD card 31 (step S19). Since the SN3 on the flash memory 32 is the same as the SN1 on the casing ROM 11, the SN3 is not overwritten with the SN1.

When the above procedure is completed, the new SD card 31 on the board 30 restores therein the firmware compressed data of the same version as the firmware on the previous SD card (previous card 31) used before the replacement and also the same operation setting data as the previous card 31. This make the board 30 possible to provide the service (i.e., managing the multiple servers 20) with the backup aid of the new SD card 31.

(B3) Pattern 3:

The pattern 3 corresponds to a case where the casing ROM 11 which has a failure is to be replaced with a new casing ROM 11. In this case, the operator turns off the power source of the casing 10 (processing device 1) and replaces the failed casing ROM 11 with a new casing ROM 11, in which a casing serial number (e.g. "SN67890") different from that (e.g., "SN012345") of the previous casing ROM 11 used before the replacement is stored beforehand. The initial value (NULL) is stored to be the firmware version in the version storing region of the casing ROM 11. After the replacing is completed, the operator turns on the power source of the new casing 10 (processing device 1).

After the casing 10 is powered on, the firmware on the MMB 30 is started and obtains the casing serial number SN1 stored in the casing ROM 11, the casing serial number SN2 stored in the SD card 31, and the casing serial number SN3 stored in the flash memory 32 along with the firmware version on the casing ROM 11 (step S11). Since the new casing ROM 11 has been replaced for the previous casing ROM 11, the casing serial number SN3 stored in the flash memory 32 and the casing serial number SN2 stored in the SD card 31 are both different from the casing serial number SN1 stored in the casing ROM 11. The firmware version stored in the casing ROM 11 is the initial value (NULL). Here, the casing serial number SN2 stored in the SD card 31 the casing serial number SN3 stored in the flash memory 32 are both "SN012345" of the casing serial number SN1 stored in the previous casing ROM 11 before the replacement. Accordingly, the combination of the obtained serial numbers SN1 to SN3 corresponds to the pattern 3 on the table T. The result of the determination by the determiner 33*a* is OK (YES route in step S12) and the data to be referred is therefore determined to be stored in the flash memory 32 (NO route in step S13). The firmware then moves to step S24 ("pattern 3" route in step S20).

Then the firmware (writing controller 33*b*) obtains the firmware version from the flash memory 32 (step S24) and copies the obtained firmware version into the version storing region of the casing ROM 11 (step S25).

In the pattern 3, since the portable medium 31 and the flash memory 32 store therein the same casing serial number, the same firmware version, and the same setting data, the steps S21-S23 performed in the pattern 2 are omitted. Alternatively, the pattern 3 may perform the steps S21-S23 in order to back up the latest data being expanded on the flash memory 32 also in the SD card 31.

Finally, the casing serial number SN1 stored in the casing ROM 11 is compared with the casing serial number SN2 stored in the SD card 31 and the casing serial number SN3 stored in the flash memory 32 (step S18). In the pattern 3, the casing serial number SN2 stored in the SD card 31 and the casing serial number SN3 stored in the flash memory 32 are both "SN012345", which is different from the SN1 "SN67890" on the new casing ROM 11 (NO route in step S18). For the above the SN1 "SN67890" on the new casing ROM 11 is overwritten the SN2 and the SN3 respectively into the storing regions on the flash memory 32 and the SD card 31 with (step S19).

When the above procedure is completed, the MMB 30 comes to be possible to provide the service (i.e., managing the multiple servers 20).

(B4) Pattern 4:

The pattern 4 corresponds to a case where the casing 10 (processing device 1) is to be powered on for the first time from the default state (initial start). In this case, when the casing 10 is powered on, the firmware on the MMB 30 is started and firstly obtains the casing serial number SN1 stored in the casing ROM 11, the casing serial number SN2 stored in the SD card 31, and the casing serial number SN3 stored in the flash memory 32 (step S11). When the casing serial number SN1 stored in the casing ROM 11 is "SN012345", the casing serial number SN2 stored in the SD card 31 and the casing serial number SN3 stored in the flash memory 32 are the respective initial values (NULL), which is different from SN1 "SN012345" on the casing ROM 11. Accordingly, the combination of the obtained casing serial numbers SN1 to SN3 corresponds to the pattern 4 in the table T. The result of the determination by the determiner 33*a* is OK (YES route in step S12) and the data to be referred is therefore determined to be stored in the flash memory 32 (NO route in step S13). The procedure then moves to step S18 ("pattern 4 or 5" route in step S20).

In the pattern 4, since the SD card (portable medium) 31 and the flash memory 32 store therein the same casing serial number, the same firmware version, and the same setting data, the steps S21-S23 performed in the pattern 2 are omitted. Alternatively, the pattern 4 may perform the steps S21-S23 in order to back up the latest data being expanded on the flash memory 32 also in the SD card 31 before the step S18 is carried out.

Finally, the casing serial number SN1 stored in the casing ROM 11 is compared with the casing serial number SN2 stored in the SD card 31 and the casing serial number SN3 stored in the flash memory 32 (step S18). In the pattern 4, the casing serial number SN2 stored in the SD card 31 and the casing serial number SN3 stored in the flash memory 32 are the respective initial values (NULL), which are different from the SN1 "SN012345" on the new casing ROM 11 (NO route in step S18). For the above the SN1 "SN012345" on the new casing ROM 11 is overwritten the SN2 and the SN3 respectively into the storing regions on the flash memory 32 and the SD card 31 with (step S19).

When the above procedure is completed, the MMB 30 comes to be possible to provide the service (i.e., managing the multiple servers 20).

(B5) Pattern 5:

The pattern 5 corresponds to a case where the casing 10 (processing device 1) is to be restarted, which means a case where the AC power source of the casing 10 is switched from the off state to the on state. In this case, when the casing is powered on again after the power source of the casing 10 is turned from the off state to the on state, the firmware on the MMB 30 is started. The firmware firstly obtains the casing serial number SN1 stored in the casing ROM 11, the casing serial number SN2 stored in the SD card 31, and the casing serial number SN3 stored in the flash memory 32 (step S11). When the casing serial number SN1 stored in the casing ROM 11 is "SN012345", the casing serial number SN2 stored in the SD card 31 and the casing serial number SN3 stored in the flash memory 32 are both "SN012345" the same as the SN1 on the casing ROM 11. Accordingly, the combination of the obtained serial numbers SN1 to SN3 corresponds to the pattern 5 in the table T and the result of the determination by the determiner 33*a* is OK (YES route in step S12) and the data to be referred is therefore determined to be stored in the flash memory 32 (NO route in step S13). The procedure then moves to step S18 ("pattern 4 or 5" route in step S20).

In the pattern 5, since the SD card (portable medium) 31 and the flash memory 32 store therein the same casing serial number, the same firmware version, and the same setting data, the steps S21-S23 performed in the pattern 2 are omitted. Alternatively, the pattern 5 may perform the steps S21-S23 in order to back up the latest data being expanded on the flash memory 32 also in the SD card 31 before the step S18 is carried out.

Finally, the casing serial number SN1 stored in the casing ROM 11 is compared with the casing serial number SN2 stored in the SD card 31 and the casing serial number SN3 stored in the flash memory 32 (step S18). In the pattern 5, the casing serial number SN2 stored in the SD card 31 and the casing serial number SN3 stored in the flash memory 32 are both "SN012345" the same as the casing serial number SN1 stored in the casing ROM 11 (YES route in step S18), which allows the procedure to skip the step S19.

When the above procedure is completed, the MMB 30 comes to be possible to provide the service (i.e., managing the multiple servers 20).

(B6) Pattern 6:

The pattern 6 corresponds to a case where the MMB 30 which has a hardware failure is to be replaced with an MMB 30 which ahs been used in another casing 10 and which is moved from the other casing 10. In this case, the operator detaches the failed board (previous board) 30 from the slot of the casing 10 and further detaches the SD card (portable medium) 31 that has been mounted on the previous MMB 30. Then the operator mounts on the same SD card 31 onto the board 30 (new board or replacement board) that has been operated on the other casing 10 and inserts the new board 30 into the slot of the casing 10.

When the new board 30 is started, the firmware firstly obtains the casing serial number SN1 stored in the casing ROM 11, the casing serial number SN2 stored in the SD card 31, and the casing serial number SN3 stored in the flash memory 32 (step S11). When the casing serial number SN1 stored in the casing ROM 11 is "SN012345", the SD card 31, which has been used on the same casing 10 and is taken over by the new board 30, has the same casing serial number SN2 "SN012345". In contrast, since the board 30 has been used in the different casing 10 and is replaced with the previous board, the casing serial number SN3 stored in the flash memory 32 corresponds to the serial number, for example "SN303030", of the different casing 10 which has mounted thereon the new board 30. Accordingly, the combination of the obtained serial numbers SN1 to SN3 corresponds to the pattern 6 on the table T. The result of the determination by the determiner 33a is OK (YES route in step S12) and the data to be referred is therefore determined to be stored in the SD card 31 (YES route in step S13).

Then, likewise the pattern 1, the steps S14-S17 are to be carried out. Specifically, the firmware (writing controller 33b) obtains operation setting data from the SD card 31 (step S14) and copies the obtained operation setting data into the storing region in the flash memory 32 (step S15). Next, the firmware compares the version of the compressed data of the firmware code stored in the SD card 31 with the version of the firmware code expanded on the flash memory 32 (step S16). If the two versions are the same (YES route in step S16), the firmware moves to the next (step S18). On the other hand, the two versions are different from each other (NO route in step S16), the firmware starts writing the firmware data on the SD card 31 into the flash memory 32 (step S17). Here, if the flash memory 32 is duplicated into two partitions, the data writing into the flash memory 32 is carried out along the procedure detailed as the above with reference to FIGS. 5 and 6.

Finally, the casing serial number SN1 stored in the casing ROM 11 is compared with the casing serial number SN2 stored in the SD card 31 and the casing serial number SN3 stored in the flash memory 32 (step S18). In the pattern 6, the casing serial number SN3 stored in the flash memory 32 is "SN303030", which is therefore different from "SN012345" representing the casing serial numbers SN1 and SN2 (NO route in step S18). For the above, the SN1 "SN012345" on the casing ROM 11 is overwritten data in the storing region of the flash memory 32 with (step S19). Since the SN2 on the SD card 31 is the same as the SN1 on the casing ROM 11, the SN2 is not overwritten with the SN1.

When the above procedure is completed, the flash memory 32 on the replacement board 30 expands therein the firmware code of the same version as that of the firmware of the previous board 30, which has been replaced with the new board 30, and also takes over the same operation setting data as that used in the previous board 30. This makes the replacement board 30 possible to provide service (i.e., managing the multiple servers 20) using the firmware version and the operation setting data that are the same as those used in the previous board 30.

(B7) Pattern 7:

The pattern 7 corresponds to a case where, in replacing the SD card 31 which has a hardware failure with a new SD card 31, a SD card 31 which has been used on an MMB 30 in another casing 10 is replaced for the failed SD card 31. In this case, the operator temporarily detaches the MMB 30 from the slot of the casing 10 and further detaches the failed SD card 31 from the MMB 30. Then the operator takes an SD card 31 which has been used in another MMB 30 for an unused new SD card 31 and erroneously mounts the SD card 31 of the different board 30 onto the board 30, and inserts the board 30 into the slot of the casing 10. Upon completion of the replacing, the operator turns on the power source of the casing 10 (processing device 1) into the on state. The replacement SD card 31 stores therein the serial number of the other casing 10 and the firmware version of the firmware operating on the MMB 30 mounted on the other casing 10.

After the power source of the casing 10 is powered on, the firmware on the MMB 30 is started and obtains the casing serial number SN1 stored in the casing ROM 11, the casing serial number SN2 stored in the SD card 31, and the casing serial number SN3 stored in the flash memory 32 along with the firmware version of the casing ROM 11 (step S11). When the casing serial number SN1 stored in the casing ROM 11 is "SN012345", since the board 30, which has been used on the same casing 10 and is not replaced, the casing serial number SN3 stored in the flash memory 32 is also "SN012345". In contrast, since the SD card 31 has been used in another casing 10 and replaced for the previous SD card 31, and the SN2 on the SD card 31 is "SN505050", which is different from the SN1 and the SN3. Accordingly, the combination of the obtained serial numbers SN1 to SN3 corresponds to the pattern 7 on the table T and the result of the determination by the determiner 33a is NG (NO route in step S12).

In this case, since a device where the setting data to be referred is stored is indeterminable so that the firmware does not find correct setting data and does not carry out the procedure any longer, the firmware version turns the processing device 1 into a fallback state. Under the fallback state, flashing the hardware alarm LED notifies the user of occurrence a firmware error (step S26). After that, the user is allowed to carry out limited commands through a non-illustrated local console to confirm the alarm log and restore the processing device 1 from the fallback state. In the pattern 7, the user recognizes that the SD card 31 has been erroneously replaced by referring the alarm log and replaces the wrong SD card 31 with the correct SD card 31. Then the procedure of FIG. 4 is carried out again.

(B8) Pattern 8:

The pattern 8 corresponds to a case where a wrong SD card 31 is mounted when the MMB 30 which has a hardware failure is to be replaced with a new MMB 30. Specifically, the pattern 8 corresponds to a case where, in replacing the failed MMB 30 with a new MMB 30, an SD card 31 which has been used in an MMB 30 on another casing 10 is erroneously taken for the SD card 31 which has been mounted on the previous board 30 and mounted on a new board 30, which is replaced for the previous board 30. In this case, the operator detaches the failed board 30 from the slot of the casing 10 and further detaches the SD card 31 from the failed board 30. Then, the operator erroneously mounts an SD card 31 which has been used in another MMB 30 onto the new board 30 and inserts the new board into the slot of the casing 10. After the replacement, the operator turns on the power source the casing 10 (processing device 1) into the on state. The SD card 31 currently replaced with the previous SD card 31 stores therein the serial number of the different casing 10 and the firmware version of the firmware operating on the MMB 30 disposed in the different casing 10.

After the power source of the casing 10 is turned on, the firmware on the MMB 30 is started and obtains the casing serial number SN1 stored in the casing ROM 11, the casing serial number SN2 stored in the SD card 31, and the casing serial number SN3 stored in the flash memory 32 along with the firmware version of the casing ROM 11 (step S11). When the casing serial number SN1 stored in the casing ROM 11 is "SN012345", the SN2 on the SD card 31 is "SN707070", which represents the serial number of the casing 10 that has previously mounted on the same SD card 31 thereon. Since the board 30 is new and unused and is replaced for the previous board 30, the obtained SN3 on the flash memory 32 is the initial value (NULL). Accordingly, the combination of the obtained serial numbers SN1 to SN3 corresponds to the pattern 8 on the table T and the result of the determination by the determiner 33a is NG (NO route in step S12). After that, the step S26 the same as performed in the pattern 7 is to be carried out in which the user recognizes that the SD card 31 has been erroneously replaced by referring the alarm log and replaces the wrong SD card 31 with the correct SD card 31. Then the procedure of FIG. 4 is carried out again.

(B9) Pattern 9:

The pattern 9 corresponds to a case where, in replacing the SD card 31 which has a hardware failure with a new SD card 31, an MMB 30 which has been used in another casing 10 is replaced as a new board 30 for the previous MMB 30. In this case, the operator detaches the previous MMB 30 from the slot of the casing 10 and further detaches the failed SD card 31 from the previous board 30. After that, the operator takes another MMB 30 operated on another casing 10 for the previous MMB 30 and erroneously mounts an unused new SD card 31 onto the wrong MMB 30 and inserts the wrong MMB 30 into the slot of the casing 10. After the replacement, the operator turns on the power source of the casing 10 (processing device 1) into the on state. The flash memory 32 on the currently replaced MMB 30 stores therein the serial number of the other casing 10 and the firmware version of the firmware operating on the wrong MMB 30 disposed in the other casing 10.

After the power source of the casing 10 is tuned on, the firmware on the board 30 is started and obtains the casing serial number SN1 stored in the casing ROM 11, the casing serial number SN2 stored in the SD card 31, and the casing serial number SN3 stored in the flash memory 32 along with the firmware version of the casing ROM 11 (step S11). When the casing serial number SN1 stored in the casing ROM 11 is "SN012345", the casing serial number SN3 on the flash memory 32, which is disposed in the MMB 30 that has been used in another casing 10, is "SN909090" which represents the other casing 10 on which the MMB 30 has been mounted. The SD card 31, which is unused and new and is replaced for the failed previous SD card 31, has the casing serial number SN2 of the initial value (NULL). Accordingly, the combination of the obtained serial numbers SN1 to SN3 corresponds to the pattern 9 on the table T and the result of the determination by the determiner 33a is NG (NO route in step S12). After that, the step S26 the same as performed in the pattern 7 is to be carried out in which the user recognizes that the MMB 30 has been erroneously replaced by referring the alarm log and replaces the wrong MMB 30 with the correct MMB 30. Then the procedure of FIG. 4 is carried out again.

(B10) Pattern 10:

The pattern 10 corresponds to a case where, in replacing the MMB 30 and the SD card 31 due to a hardware failure, both the MMB 30 and SD card 31 are both to be replaced with an MMB 30 and an SD card 31 that has been used in another casing 10. In this case, the operator temporarily detaches the previous MMB 30 from the slot of the casing 10 and further detaches the failed the SD card 31 from the MMB 30. Then, the operator takes the MMB 30 and the SD card 31 which have been used in another casing 10 for the MMB 30 and SD card 31 which would be replaced for the previous MMB 30 and SD card 31 and erroneously inserts the wrong MMB 30 and the wrong SD card 31 into the slot of the casing 10. After the replacement, the operator turns on the casing 10 (processing device 1) into the on state. The flash memory 32 on the power source of the MMB 30 and the SD card 31 that are mounted after the replacement stores therein the serial number of the other casing 10 and the firmware version of the firmware operating on the MMB 30 disposed in the other casing 10.

After the power source of the casing 10 is powered on, the firmware on the MMB 30 is started and obtains the casing serial number SN1 stored in the casing ROM 11, the casing serial number SN2 stored in the SD card 31, and the casing serial number SN3 stored in the flash memory 32 along with the firmware version of the casing ROM 11 (step S11). The casing serial number SN1 stored in the casing ROM 11 is "SN012345" while, since the MMB 30 has operated on another casing 10, the casing serial number SN3 stored in the flash memory 32 is "SN909090", which represents the other casing 10 on which the MMB 30 has previously been mounted. The SD card 31, which has been operated on the other casing 10, stores therein the casing serial number SN3 "SN909090", which represents the other casing 10 on which the SD card 31 has previously operated. Accordingly, the combination of the obtained serial numbers SN1 to SN3 corresponds to the pattern 10 on the table T and the result of the determination by the determiner 33a is NG (NO route in step S12). After that, the step S26 the same as performed in the pattern 7 is to be carried out in which the user recognizes that the MMB 30 and the SD card 31 have been erroneously replaced by referring the alarm log and replaces the wrong MMB 30 and the wrong SD card 31 with the correct MMB 30 and the correct SD card 31. Then the procedure of FIG. 4 is carried out again.

(3) Effects of the Processing Device and the Management Board:

The processing device 1 and the MMB 30 detailed as the above determine a device that stores the data that is to be referred by the firmware among multiple devices (i.e., the portable medium 31 and the flash memory 32) through referring to the casing serial numbers on the casing ROM 11, the portable medium 31, and the flash memory 32.

Thereby, it is possible to automatically determine which device stores correct data even after a device in the processing device 1 is replaced for maintenance.

On the basis of the result of the determination, data writing into the casing ROM 11, the portable medium 31, and the flash memory 32 is controlled. This makes the processing device 1 (MMB 30), after undergoing replacement of a device therein, possible to provide service similarly to the service provided before the replacement, i.e., managing multiple servers, using the firmware version and the setting data also used before the replacement.

Accordingly, when the board 30 and the portable medium 31 are to be replaced for maintenance, the system manager and the maintenance operator do not have to update the firmware and restore the setting data any longer so that the procedural steps can be reduced. This also can reduce the time of system halt for maintenance. Furthermore, the operation made by the operator or the system manager can be reduced, which reduces risk of system halt caused by operation mistakes.

When it is determined that the place (device) where the setting data to be referred by the firmware is indeterminable, the user can recognize the indeterminable state to be a firmware error through a display function by means of, for example, an LED lamp or a notification function by means of, for example, voice or alarm sound. Thereby, the user confirms the alarm log and recovers the processing device 1 from the error. Accordingly, after the recovery operation, the processing device 1 (MMB 30) is allowed to provide service similarly to the service provided before the replacement, i.e., managing multiple servers, using the firmware version and the setting data also used before the replacement.

(4) Others:

The preferable embodiment of the present invention is described as the above, but the present invention should by no means be limited to the foregoing embodiment. Various changes and suggestions can be suggested without departing the concept of the present invention.

The above first embodiment assumes that the present invention is applied to an MMB in a blade system. However, the present invention is not limited to this. Besides, the present invention can be applied to another firmware product having the configuration of FIG. 1, and can obtain the similar advantageous effects as those of the first embodiment. For example, the present invention can be applied to the firmware on each individual server blade in the blade system, which is replacing the board having a hardware failure in the server blade. Also in this case, the SD card is taken from the previous board to the new board and the processing logic the same as the first embodiment is implemented in the firmware. This makes the new board used after the replacement possible to restore the same firmware version as that on the previous board and thereby provide the same service as that provided before the replacement.

The entire and part of the functions as the determiner 33*a* and the writing controller 33*b* is carried out a computer (including CPU, information processing apparatus, and various terminals) executing a predetermined application program.

The program may be in the form of being stored in a computer-readable recording medium such as a flexible disk, a CD (e.g., CD-ROM, CD-R, and CD-RW), a DVD (e.g., DVD-ROM, DVD-RAM, DVD-R, DVD-RW, DVD+R, and DVD+RW), and a Blu-ray disk. The computer reads the program from the recording medium and stores the program into an internal or external memory for future use.

Here, a computer is a concept of a combination of hardware and an OS and means hardware which operates under control of the OS. Otherwise, if an application program operates hardware independently of an OS, the hardware corresponds to the computer. Hardware includes at least a microprocessor such as a CPU and means to read a computer program recorded in a recording medium. The application program includes a program code to causes a computer as defined the above to achieve the functions as the determiner 33*a* and the writing controller 33*b*. Part of the functions may be achieved by the OS, not by the application program.

The technique disclosed herein makes it possible to automatically determine which device stores correct data even after a device is replaced for maintenance.

All examples and conditional language provided herein are intended for pedagogical purposes to aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiment(s) of the present invention have been described in detail, it should be understood that the various changes, substitutions, and alterations could be made hereto without departing from the spirit and scope of the invention.

What is claimed is:

1. A processing device comprising
a casing;
a first processor disposed in the casing; and
a management board that is detachably mounted on the casing and that manages the first processor,
the casing comprising a memory that stores therein first identification data to identify the casing,
the management board comprising
a non-volatile memory that stores therein second identification data of the casing mounting thereon the management board and second setting data that is to be referred by firmware;
a portable recording medium that is detachably mounted on the management board and that stores therein third identification data of the casing mounting thereon the management board that mounts thereon the portable recording medium and third setting data that is to be referred by firmware; and
a second processor, wherein
the second processor determines, using the first identification data stored in the memory, the second identification data stored in the non-volatile memory, and the third identification data stored in the portable recording medium being mounted on the management board, whether the non-volatile memory or the portable recording medium stores setting data to be referred by the firmware that is to operate on the management board.

2. The processing device according to claim 1, wherein
the memory stores therein first firmware version data of firmware of the casing;
the non-volatile memory stores therein second firmware version data of the firmware operating on the management board;
the portable recording medium stores therein third firmware version data of the firmware operating on the management board mounting thereon the portable recording medium; and
the second processor determines, using the first identification data and the first firmware version data that are stored in the memory, the second identification data and the second firmware version data that are stored in the non-volatile memory, and the third identification data and the third firmware version data that are stored in the portable recording medium being mounted on the management board, whether the non-volatile memory or the portable recording medium stores setting data to be referred by the firmware operating on the management board.

3. The processing device according to claim 2, wherein
the second processor controls data writing into the memory, the non-volatile memory, and the portable recording medium using a result of the determining.

4. The processing device according to claim 3, wherein when the first identification data stored in the memory is the same as the third identification data stored in the portable recording medium mounted on the management board and also the second identification data stored in the non-volatile memory is an initial value, the second processor determines that the management board is replaced for a previous management board and that setting data to be referred by firmware that is to operate on the management board is stored in the portable recording medium.

5. The processing device according to claim 4, wherein when it is determined that the first management board is replaced for the previous management board, the second processor writes the third setting data stored in the portable medium, as the second setting data, into the non-volatile memory.

6. The processing device according to claim 4, wherein:
the portable recording medium stores therein a code of firmware that operates on the previous management board used before the replacing and firmware version data of the firmware that operates on the previous management board to be the third firmware version data; and
when it is determined that the management board is replaced for the previous management board and also the third firmware version data stored in the portable recording medium is different from the second firmware version data stored in the non-volatile memory being mounted on the management board, the second processor writes the third firmware version data and the code stored in the portable recording medium into the non-volatile memory of the management board.

7. The processing device according to claim 4, wherein when it is determined that the management board is replaced for the previous management board, the second processor overwrites the second identification data stored in an identification data storing region in the non-volatile memory with the first identification data stored in the memory.

8. The processing device according to claim 3, wherein when the first identification data stored in the memory is the same as the second identification data stored in the non-volatile memory and also the third identification data stored in the portable recording medium being mounted on the management board is an initial value, the second processor determines that the portable recording medium is replaced for a previous portable recording medium and that the setting data that is to be referred by the firmware that is to operate on the management board is stored in the non-volatile memory.

9. The processing device according to claim 8, wherein when it is determined that the portable recording medium is replaced for the previous portable recording medium, the second processor overwrites the third identification data stored in an identification data storing region of the portable recording medium with the first identification data stored in the memory.

10. The processing device according to claim 3, wherein when the second identification data stored in the non-volatile memory is the same as the third identification data stored in the portable recording medium being mounted on the management board, the first identification data stored in the memory is different from the second identification data and the third identification data, and also the first firmware version data stored in the memory is an initial value, the second processor determines that the memory is replaced for a previous memory and that setting data to be referred by firmware that is to operate on the management board is stored in the non-volatile memory or in the portable recording medium.

11. The processing device according to claim 10, wherein when it is determined that the memory is replaced for the previous memory, the second processor writes the second firmware version data stored in the non-volatile memory into a firmware version storing region of the memory.

12. The processing device according to claim 10, wherein when it is determined that the memory is replaced for the previous memory, the second processor overwrites the second identification data and the third identification data stored in identification data storing regions of the non-volatile memory and the portable recoding medium with the first identification data stored in the memory.

13. The processing device according to claim 3, wherein:
when the second identification data stored in the non-volatile memory and the third identification data stored in the portable recording medium being mounted on the management board are initial values and also the memory stores the first identification data of the casing, the second processor determines that the processing device is in a state of being powered from a default state for the first time and that setting data to be referred by firmware that is to operate on the management board is stored in the non-volatile memory or in the portable recording medium; and
when it is determined that the processing device is in a state of being powered from a default state for the first time, the second processor overwrites the second identification data and the third identification data stored in identification data storing regions of the non-volatile memory and the portable recording medium with the first identification data stored in the memory.

14. The processing device according to claim 3, wherein when the second identification data stored in the non-volatile memory is the same as the third identification data stored in the portable recording medium being mounted on the management board and as the first identification data stored in the memory, the second processor determines that the processing device is in a state of being restarted and that setting data to be referred by firmware that is to operate on the management board is stored in the non-volatile memory or in the portable recording medium.

15. The processing device according to claim 3, wherein when the first identification data stored in the memory is the same as the third identification data stored in the portable recording medium being mounted on the management board and also the second identification data stored in the non-volatile memory is different from the third identification data stored in the portable recording medium being mounted on the management board and the first identification data stored in the memory, the second processor determines that the management board is moved from another casing and is replaced for a previous management board and that the setting data to be referred by firmware that is to operate on the management board is stored in the portable recording medium.

16. The processing device according to claim 15, wherein when it is determined that the management board is moved from another casing and is replaced for the previous management board, the second processor writes the third setting data stored in the portable recording medium into the non-volatile memory.

17. The processing device according to claim 15, wherein:
the portable recording medium stores therein a code of the firmware that operates on the previous management board used before the replacing and firmware version data of the firmware that operates on the previous management board to be the third firmware version data; and
when it is determined that the management board is moved from another casing and is replaced for the previous management board and also the third firmware version data stored in the portable recording medium is different from the second firmware version stored in a version data storing region of the non-volatile memory, the second processor writes the third firmware version data and the code stored in the portable recording medium into the non-volatile memory of the management board.

18. The processing device according to claim 15, wherein when it is determined that the management board is moved from another casing and is replaced for the previous management board, the second processor overwrites the second identification data in an identification data storing region of the non-volatile memory with the first identification data stored in the memory.

19. The processing device according to claim 3, wherein when whether the non-volatile memory or the portable recording medium stores the setting data to be referred by the firmware operating on the management board is indeterminable, the second processor determines that an firmware error is occurring.

20. A management board that is detachably mounted on a casing and that manages a first processor disposed in the casing, the management board comprising:
a non-volatile memory that stores therein first identification data to identify the casing mounting thereon the management board and first setting data that is to be referred by firmware;
a portable recording medium that is detachably mounted on the management board and that stores therein second identification data of the casing mounting thereon the management board that mounts thereon the portable recording medium and second setting data that is to be referred by firmware; and
a second processor, wherein
the second processor determines, using the first identification data stored in the non-volatile memory, the second identification data stored in the portable recording medium being mounted on the management board, and third identification data stored in a memory disposed in the casing, whether the non-volatile memory or the portable recording medium stores setting data to be referred by the firmware is to operate on the first management board.

* * * * *